United States Patent [19]

Forschirm

[11] 4,336,287

[45] Jun. 22, 1982

[54] NON-HYDROGENATED THERMOPLASTIC ELASTOMER COATED FRAGMENT RETENTIVE RETURNABLE GLASS CONTAINERS AND PROCESS FOR THE PREPARATION THEREOF

[75] Inventor: Alex S. Forschirm, Parsippany, N.J.

[73] Assignee: Celanese Corporation, New York, N.Y.

[21] Appl. No.: 109,583

[22] Filed: Jan. 4, 1980

[51] Int. Cl.$^3$ .................................................. B65D 11/16
[52] U.S. Cl. ........................................ 428/35; 65/60.3; 215/DIG. 6; 427/29; 427/195; 427/203; 427/377; 427/407.2; 427/430.1; 427/389.7; 428/441
[58] Field of Search ................. 427/377, 389.7, 430.1, 427/27, 29, 195, 202, 203, 421, 407.2; 428/35, 441, 521; 215/12 R, DIG. 6; 65/60 B

[56] References Cited

U.S. PATENT DOCUMENTS

| | | | |
|---|---|---|---|
| 3,281,383 | 10/1966 | Zelinski et al. | 525/106 |
| 3,686,365 | 8/1972 | Sequeira | 525/89 |
| 3,692,874 | 9/1972 | Farrar et al. | 525/105 |
| 3,823,032 | 7/1974 | Ukai | 215/DIG. 6 |
| 3,932,327 | 1/1976 | Naylor | 525/89 |
| 3,932,332 | 1/1976 | Douglas et al. | 525/98 |
| 3,979,000 | 9/1976 | Karabedian | 215/12 R |
| 4,110,500 | 8/1978 | Evans et al. | 428/35 |
| 4,133,923 | 1/1979 | Blunt | 428/35 |
| 4,171,056 | 10/1979 | Hannon et al. | 215/12 R |
| 4,188,432 | 2/1980 | Holden et al. | 428/35 |
| 4,201,834 | 5/1980 | Hannon et al. | 427/389.7 |

*Primary Examiner*—Ronald H. Smith
*Assistant Examiner*—S. L. Childs
*Attorney, Agent, or Firm*—Kenneth A. Genoni

[57] ABSTRACT

A process for preparing coated glass containers is disclosed. This process comprises applying a coating of an unhydrogenated thermoplastic elastomer on the outside of the glass container and then baking the coated glass container in the presence of oxygen gas at a temperature of from about 150° to about 170° C. for a time period of from about 10 to about 45 minutes. The coated glass containers are both glass fragment retentive and returnable.

9 Claims, No Drawings

NON-HYDROGENATED THERMOPLASTIC ELASTOMER COATED FRAGMENT RETENTIVE RETURNABLE GLASS CONTAINERS AND PROCESS FOR THE PREPARATION THEREOF

BACKGROUND OF THE INVENTION

Glass containers, although aesthetically desirable for many applications, sometimes present severe safety problems especially when the contents of these containers are pressurized, as is the case of carbonated beverages such as soft drinks and beer. It is known that when glass bottles containing such carbonated beverages are dropped, there is a significant danger of not only breaking of the bottle but also of scattering of the fragments of the broken bottle. Many times the real danger in the breaking of such a bottle is not the actual breaking itself but rather the scattering of glass fragments caused by the impact.

In attempting to solve this problem of the scattering of glass fragments, the prior art has employed various coatings and coating procedures. One limitation on the use of many particular coating materials is the fact that many glass containers must be "returnable," i.e., returned by the customer to the bottler for cleaning, sterilization, and refill. Indeed, with the present emphasis on materials conservation, it is of even greater importance that any coating applied to a glass bottle be such that it is not substantially removed when subjected to the cleaning and sterilization procedures at a carbonated beverage bottling plant.

An attempt to solve the above problems of the prior art is disclosed in U.S. Pat. No. 3,823,032.

This patent discloses a glass bottle which is coated on its outer surface by two layers referred to as an inner layer and an outer layer. The inner layer can be a thermoplastic elastomer. However, the inner layer is required to exhibit a minimum adhesion to the glass bottle surface and employs an anti-bonding agent to achieve this affect. When the thermoplastic elastomer is applied it is heated to only 120° C. for 30 minutes in one instance and at room temperature in another instance. Such temperatures are acceptable in the context of this patent but are not suitable when good adhesion is sought to be obtained between the glass bottle and the coating.

Glass containers have been rendered fragment retentive by applying a two layer coating to the external surface thereof as illustrated by commonly assigned U.S. Pat. No. 4,171,056 in the name of M. Hannon and A. Forschirm entitled "Coated Bottle and Method of Coating." The first or inner layer is applied as a non-tacky powder particle composite which includes unhydrogenated and preferably hydrogenated thermoplastic elastomer block copolymers used in combination with a specifically defined melt flow modifier. The powder particle composite is electrostatically sprayed onto the external surface of the glass container and baked at temperatures of about 180° to about 300° C. for about 10 to about 30 minutes. These temperatures are necessary to assure fusion of the composite powder particles to form a continuous nonparticulate layer. At temperatures below 180° C. complete fusion would not occur and the coating would be discontinuous, weak, and exhibit a poor appearance.

An outer coat of a synthetic resin such as epoxy resins, polyurethanes, polycarbonates, polyesters, polystyrenes, ethylene/vinyl acetate copolymers, acrylic acid, homopolymers and copolymers is then applied to substantially the entire outer surface of the inner coat and part of the glass container surface. The present invention, which does not employ hydrogenated thermoplastic elastomers, requires lower bake temperatures, and exhibits good adhesion to the glass container surface when exposed to an alkaline wash.

U.S. Pat. No. 4,163,031 in the name of M. Hannon and A. Forschirm entitled "Powder Composition and Method" is directed to a powder composition useful for coating applications comprising a melt blend mixture of a thermoplastic elastomer block copolymer which is selectively hydrogenated to at least some degree and at least one melt flow modifier.

U.S. Pat. No. 4,201,834 in the name of M. Hannon and R. Green entitled "Powder Composition and Method of Preparation" is directed to the powder composition of composite non-tacky powder particles employed in the method of U.S. Pat. No. 4,171,056 discussed above.

The search has continued for novel coatings and coating procedures for glass containers wherein the coated glass container is both fragment retentive and returnable. This invention was made as a result of that search.

It is an object of the present invention to provide glass containers which are fragment retentive.

Another object of the present invention is to provide glass containers which are returnable, i.e., resistant to delamination of the thermoplastic elastomer coating when subjected to an alkaline wash.

Still another object of the present invention is to provide a process for preparing glass containers which are both fragment retentive and returnable.

Other objects and advantages of the present invention will become apparent from the following summary and description of the preferred embodiments of the present invention.

SUMMARY OF THE INVENTION

In one aspect, the present invention provides a process for preparing a fragment retentive, returnable glass container which comprises:
  (a) applying a coating of an unhydrogenated thermoplastic elastomer on the outside of the glass container, and
  (b) baking the coated glass container in the presence of oxygen gas at a temperature of from about 150° to about 170° C. for a period of from about 10 to about 45 minutes.

In another aspect, the present invention provides a fragment retentive, returnable glass container comprising a glass container coated on the outside with an unhydrogenated thermoplastic elastomer which has been baked in the presence of oxygen gas at a temperature of from about 150° to about 170° C. for a time period of from about 10 to about 45 minutes.

The essence of the present invention is the discovery that when a glass container is coated with a thermoplastic elastomer and baked at the temperatures described herein, it is rendered fragment retentive and that such a baked thermoplastic elastomer coating resists delamination during cleaning and sterilization processes commonly employed by carbonated beverage bottling companies.

DESCRIPTION OF THE PREFERRED EMBODIMENTS

The first step of the present process comprises applying a coating of a thermoplastic elastomer to the external surface of a glass container. Any glass container which is desired to be rendered fragment retentive is useful in the process of the present invention.

This glass container to which the thermoplastic elastomer is applied also includes those which have been processed by applying typical well known "hot end" and/or "cold end" coatings such as illustrated by U.S. Pat. Nos. 3,801,361 and 3,420,693 the disclosures of which are herein incorporated by reference although such coatings may reduce the adhesion of the thermoplastic elastomer to some extent. These coatings are applied to glass bottles to impart scratch resistance and lubricity thereto prior to coating with the thermoplastic elastomer.

Glass bottles which will eventually be pressurized are particularly preferred, such as those intended to hold carbonated beverages including soft drinks and beer.

Thermoplastic elastomers, which are well known in the art, are polymeric materials that behave in some ways like thermoplastics and in other ways like elastomers. They behave like thermoplastics in that above their softening point they may be processed using ordinary plastics processing equipment. For example, they may be formed by thermoplastic injection molding, extrusion, blow molding, or vacuum forming. On the other hand, when utilized below their softening point, they behave like elastomers, i.e., they exhibit the properties normally associated with vulcanized rubbers without having been subjected to vulcanization. Thus, such polymers have the elastic and resilient properties of rubber but may be processed and reprocessed like ordinary thermoplastics.

The thermoplastic elastomers useful in the present invention include block copolymers having at least two kinds of polymer blocks one of which is a diene polymer block possessing olefinic double bonds. Such copolymers useful in the present invention are described in "Applied Polymer Science," Chapter 29, p. 394ff, of *Organic Coatings and Plastics Chemistry* (Craver & Tess, 1975) which is hereby incorporated by reference.

Preferred block copolymers for use in the present invention are radial or branched block copolymers. By "radial" or "branched" copolymers is meant copolymers having the general configuration $$Z-(BA)_n$$

wherein each A group is a terminal block segment comprising a polymer made from a monovinyl or alpha alkyl monovinyl arene and each B is a block segment comprising a polymer made from a conjugated diene, Z is derived from a polyfunctional compound having at least three reactive sites, and n is not less than 3. The radial block copolymer, as herein defined, must have at least three block copolymer branches radiating from a nucleus Z.

The "Z" group which forms the nucleus from which the polymer blocks of the radial block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. A preferred polyfunctional compound is a silica containing compound.

The preparation of the preferred radial block copolymers of this invention may be any technique known to those skilled in this art, such as those described in U.S. Pat. Nos. 3,932,327, 3,692,874 and 3,281,383, the disclosures of which are all hereby incorporated by reference. These radial block copolymers are available commercially as Solprene TM thermoplastic elastomers.

The thermoplastic elastomers useful in the present invention comprise generally from about 5 to about 50, typically from about 10 to about 40, and preferably from about 15 to about 35%, by weight, monovinyl or alpha alkyl monovinyl arenes and generally from about 50 to about 95, typically from about 60 to about 90, and preferably from about 65 to about 85%, by weight, conjugated diene.

When the amount of monovinyl arene is greater than about 50% by weight, the thermoplastic elastomer becomes less rubbery and more plastic. Thus, such a thermoplastic elastomer may provide reduced glass fragment retention when applied to a bottle. When the amount of monovinyl arene is less than about 5% by weight, the final composition becomes more tacky, is essentially an unvulcanized rubber, and may have reduced adhesion to glass containers such as glass bottles.

The monovinyl arene or alpha alkyl monovinyl arene useful as the aromatic block of the thermoplastic elastomer includes styrenes, alpha alkyl styrenes; ring alkylated styrenes, such as vinyl toluene and t-butyl styrene; alpha, alpha dialkyl styrenes; ring halogenated styrenes such as the chlorostyrenes, vinyl naphthalenes and the like or mixtures thereof. Styrene and alpha methyl styrene are preferred.

These arene monomers may contain minor proportions, based on the arene, of copolymerizable monomers that have conjugated double bonds such as conjugated dienes, vinyl pyridines, and the like.

The conjugated dienes useful in preparing the thermoplastic elastomer include butadiene, alkyl substituted butadienes such as isoprene, 2,3-dimethyl butadiene, ethyl butadiene, methyl pentadiene, (piperylene) and the like, or mixtures thereof. The alpha, gamma conjugated butadienes are preferred. Unsubstituted alpha, gamma butadiene is particularly preferred.

The conjugated diene blocks also include diene copolymers containing up to 35%, by weight, in block B of a monovinyl arene such as styrene or alpha methyl styrene distributed therein in a non-block, i.e., random or tapered configuration.

A typical, but by no means exhaustive, list of suitable block polymers includes the following:
Polystyrene-polybutadiene-polystyrene;
Polystyrene-polyisoprene-polystyrene;
Polystyrene-polybutadiene (polybutadiene-polystyrene)$_{2-5}$;
Polystyrene-(polyisoprene-polystyrene)$_{2-5}$;
Polystyrene-poly(ethyl-butadiene)-polystyrene;
Polystyrene-poly(random butadiene-styrene)-polystyrene;
Poly(alpha-methylstyrene)-polybutadiene-poly (alpha-methylstyrene);
Poly(alpha-methylstyrene)-polyisoprene-poly (alpha-methylstyrene);
Poly(styrene-alpha-methylstyrene)-poly(-butadieneisoprene) (styrene-alpha-methylstyrene); and Poly(vinylxylene)-polybutadiene-poly(vinylxylene).

Note that the subscript 2-5 to the above copolymers represents a typical number of repeat blocks in radial block copolymers. The number average molecular weight of the thermoplastic elastomers useful in the present invention may be generally from about 15,000 to about 150,000, typically from about 30,000 to about 100,000, and preferably from about 50,000 to about 80,000. In general, the higher the number average molecular weight of the thermoplastic elastomer, the poorer its melt flow. However, the amount of monovinyl arene in the thermoplastic elastomer has a more significant effect on melt flow than the number average molecular weight of the thermoplastic elastomer.

While not wishing to be bound by any particular theory, it is believed that the improvement in adhesion to the glass container results from oxidation at the double bonds of, or at the carbon bonds adjacent to, the double bonds of the conjugated diene. It will be apparent from the above description that thermoplastic elastomers possess unsaturation in the form of olefinic double bonds in the conjugated diene polymer block and in the form of aromatic double bonds in the arene polymer blocks. It is a common practice in the prior art to subject thermoplastic elastomers to a hydrogenation treatment to saturate all or part of the double bonds in the diene polymer block as illustrated by U.S. Pat. No. 3,686,365. During the course of such treatments the hydrogenation may not be completely selective and aromatic double bonds may be hydrogenated also. In view of the proposed mechanism that the improvement in adhesion results in oxidation of the double bonds of the diene polymer block it is essential that as many of the double bonds initially present in the diene polymer block upon formation of the thermoplastic elastomer be left intact. Stated another way it is essential that the diene polymer blocks of the thermoplastic elastomer upon formation must not be subjected to either partial or complete hydrogenation in a separate treatment. While saturation of the arene polymer blocks only would not be expected to affect the adhesion of the coating to the bottles it would adversely affect the plastic properties of the polymer. Consequently, the term "unhydrogenated thermoplastic elastomer" as used herein is intended to exclude thermoplastic elastomers which have undergone a hydrogenation treatment to substantially reduce the unsaturation initially present therein to the extent that the adhesive or plastic properties thereof are adversely affected.

The thermoplastic elastomer coating may be applied to the glass container by any means known to those having ordinary skill in this art. Such coatings may be applied for example, by spraying the thermoplastic elastomer material onto the surface of the glass container as a powder, by electrostatic spraying of the thermoplastic elastomer on a hot external glass surface, by dipping the glass container, maintained at the appropriate temperature, into a fluidized bed of thermoplastic elastomer material in powdered form, or by dipping the glass container into a molten bath of the thermoplastic elastomer material. Alternatively, and preferably the thermoplastic elastomer may be mixed with various amounts of solvent and applied using a doctor blade.

If the thermoplastic elastomer is applied to the glass container as a powder, a melt flow modifier can be employed. Suitable melt flow modifiers are disclosed in U.S. patent application Ser. No. 844,812, filed Oct. 25, 1977, now abandoned, the disclosure of which is herein incorporated by reference.

The coating of thermoplastic elastomers on a glass surface has a thickness of generally less than about 0.51 mm, typically less than about 0.38 mm, and preferably less than about 0.25 mm. The thickness preferably should not be less than about 0.13 mm and typically will vary from about 0.51 to about 0.13 mm.

The coating step may be carried out at a temperature of generally from about 20° to about 100° C., typically from about 20° to about 85° C., and preferably from about 20° to about 50° C.

Any pressures, either subatmospheric, atmospheric, or superatmospheric may be employed, although substantially atmospheric pressures are preferred.

The second step of the present process comprises baking the coating glass container in the presence of oxygen gas at a temperature of from about 150° to about 170° C. and preferably from about 150° to about 160° C. for a time of from about 10 to about 45, and preferably from about 10 to about 30 minutes, to produce a fragment retentive, returnable glass container. It has been found that the above noted temperature and time ranges as well as the need for oxygen gas are critical during this baking step.

If a temperature substantially greater than 170° C. is employed, the thermoplastic coating discolors as a result of degradation. If a temperature substantially less than about 150° C. at a bake time of, for example, of 10 minutes is employed, then the adhesion of the polymer to the glass is poor. If the baking is carried out within the above temperature range for substantially more than 45 minutes, the thermoplastic polymer discolors as a result of degradation. If the baking is carried out in this temperature range for substantially less than 10 minutes, then the adhesion of the polymer to the glass is poor. It is to be understood that the lower bake temperatures are employed in conjunction with longer bake times and vice-versa.

The term "oxygen gas" as used in the instant specification and claims is meant to include pure molecular oxygen gas or a mixture of gases containing molecular oxygen gas. A preferred oxygen gas containing mixture is air.

As described above, it is believed that oxidation is a necessary mechanism for adhesion of the thermoplastic elastomer to the glass. It has been found that if a film of Solprene TM 414 thermoplastic elastomer is heated at 150° C. with an atmosphere of nitrogen gas (i.e., in the substantial absence of oxygen gas), no adhesion to the glass results. However, when an atmosphere of air is employed, the adhesion of the polymer to the glass is excellent. Furthermore, when Kraton TM G-1652 polymer (which is chemically similar to the Solprene TM 414 thermoplastic elastomer but different in that it contains no oxidizable carbon-double bonds due to a hydrogenation treatment) is employed in place of the Solprene TM 414 thermoplastic elastomer, substantially no adhesion to glass results when the coated glass is heated in air at 150° C.

Baking may be carried out in any apparatus known to those having ordinary skill in this art. Such apparatus includes a forced hot air oven, under infra-red heating elements, heat radiation, or any other suitable means of heating the surface.

The coated glass containers of the present invention contain generally from about 1 to about 10% typically from about 1 to about 5% and preferably from about 1 to about 2% thermoplastic elastomer, by weight, of the coated glass container.

The coated glass containers produced in accordance with the process of the present invention are both fragment retentive and returnable. A glass container is "fragment retentive" for purposes of this specification if such a glass container charged with a liquid and air pressurized to 60 psi is dropped 4.5 feet onto a steel plate embedded in concrete, and at least about 95% of the glass fragments are contained within a radius of 1.5 feet. A glass container is "returnable" for purposes of this specification if such a glass container may be cleaned (typically treated with 2 N sodium hydroxide) and sterilized according to well known bottling techniques without substantial removal or destruction of the coating.

After the thermoplastic elastomer is applied, an outer coating of a synthetic resin such as those described in U.S. patent application Ser. No. 844,820, U.S. Pat. No. 4,171,056 described herein, can be applied to the outer surface of the thermoplastic elastomer coating.

The present process may be carried out in a batch, continuous, or semi-continuous manner as desired.

The present invention is further illustrated by the following examples. All parts and percentages in the examples as well as in the specification and claims are by weight unless otherwise specified.

EXAMPLE 1

A solution of Solprene TM 414 unhydrogenated thermoplastic elastomer (a block copolymer of 60% by weight butadiene and 40% by weight styrene) is prepared at 25% solids content in xylene. This solution is applied with a brush to two 10 ounce glass bottles for holding carbonated soft drinks. The xylene is evaporated and leaves a film having a thickness of 5-6 mils.

The coated glass bottles are then baked in air at 150° C. for 25 minutes.

Fragment retention is measured on one of the glass bottles by filling it with water and air at a pressure of 60 psi and then breaking the bottle by dropping it 4.5 feet onto a steel plate embedded on concrete. Over 95% of the glass fragments are contained within a radius of 1.5 feet.

The other coated glass bottle is tested for the adherence of the applied coating to the glass surface by immersing it in an aqueous solution of 3.5% by weight sodium hydroxide at about 75° C. in an oven. After 15 minutes, the plate is removed and it is found that the coating adheres tightly even when subjected to a strong air stream of hot water and vigorous stressing with finger pressure.

The test is repeated nine more times with little change in adhesion. Fragment retention is still excellent after the caustic treatment.

EXAMPLE 2

Coatings of the thermoplastic elastomer solution employed in Example 1 are applied to one side of several 4"×4"×⅛" cleaned glass panels by drawing down the solution with a doctor blade. The panels are then baked at varying temperatures and times as shown at Table I.

A portion of each test panel is then tested for the adhesion of the coating in accordance with the procedures of Example I using a 3.5% by weight aqueous sodium hydroxide solution.

The coating is judged to exhibit poor adhesion when it comes off after only 1 or 2 aqueous caustic wash cycles. The coating is judged to exhibit fair adhesion when it can withstand about 7 to 8 caustic wash cycles, and good when it can withstand 10 caustic wash cycles.

TABLE I

| Run No. | Bake Time (min.) | Bake Temperature °C. | Adhesion |
|---|---|---|---|
| 1 | 2 | 100 | Poor |
| 2 | 2 | 140 | Poor |
| 3 | 2 | 150 | Poor |
| 4 | 2 | 160 | Poor |
| 5 | 10 | 100 | Poor |
| 6 | 10 | 140 | Poor |
| 7* | 10 | 150 | Good |
| 8* | 10 | 160 | Fair |
| 9 | 30 | 100 | Poor |
| 10 | 30 | 140 | Poor |
| 11* | 30 | 150 | Good |
| 12* | 30 | 160 | Good |

*Indicates runs are within scope of the invention.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in this art without departing from the spirit of the invention.

What is claimed is:

1. A process for preparing a fragment retentive returnable coated glass container which comprises:
   (A) applying a coating consisting essentially of a thermoplastic elastomer comprising a block copolymer which is unhydrogenated and has at least two kinds of polymer blocks wherein one polymer block is designated by A and a second polymer block is designated by B such that:
   (1) each A is a polymer end block of a monovinyl or alpha alkyl monovinyl arene having a number average molecular weight in the range of from about 5,000 to about 75,000, said blocks A comprising from about 5 to about 50% by weight of the total block copolymer, and
   (2) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer,
   to the external surface of a glass container by dipping said glass container into a molten bath of the thermoplastic elastomer, or by coating said glass container with a solution of said thermoplastic elastomer in a compatible solvent and evaporating the same; and
   (B) baking said coated glass container in the presence of oxygen gas at a temperature of from about 150° to about 170° C. for a time period of from about 10 to about 45 minutes.

2. The process of claim 1 wherein said monovinyl arene portion of said thermoplastic elastomer block copolymer is styrene and wherein said conjugated diene portion of said block copolymer is unsubstituted alpha, gamma butadiene and wherein the block copolymer has a number average molecular weight of from about 15,000 to about 150,000.

3. The process of claim 2, wherein in said thermoplastic elastomer said A blocks comprise from about 10 to about 40% by weight of the total block copolymer, and said B blocks comprise from about 60 to about 90% by weight of the total block copolymer and wherein the coated glass container is heated to a temperature of about 150° to about 160° C. for a time of about 10 to about 30 minutes.

4. The process of claim 3, wherein in said thermoplastic elastomer said A blocks comprise from about 15 to about 35% by weight of the total block copolymer, and said B blocks comprise from about 65 to about 75% by weight of the total block copolymer.

5. The process of claim 1, wherein said process is carried out at substantially atmospheric pressure; said coating has a thickness of less than about 0.51 mm; and the glass container is a glass bottle.

6. The process of claim 1, wherein the glass container is a glass bottle for carbonated beverages.

7. A fragment retentive, returnable glass container comprising a glass container having coated thereon a coating consisting essentially of an unhydrogenated thermoplastic elastomer which has been baked in the presence of oxygen gas at a temperature from about 150° to about 170° C. for a time period of from about 10 to about 45 minutes, said unhydrogenated thermoplastic elastomer comprising:

(A) a block copolymer which is unhydrogenated and has at least two kinds of polymer blocks wherein one polymer block is designated by A and a second polymer block is designated by B such that:
  (1) each A is a polymer end block of a monovinyl of alpha alkyl monovinyl arene having a number average molecular weight in the range of from about 5,000 to about 75,000, said blocks A comprising from about 5 to about 50% by weight of the total block copolymer, and
  (2) each B is a polymer mid block having a number average molecular weight of from about 30,000 to about 300,000, and formed from a conjugated diene selected from homopolymers of at least one conjugated diene having 4 to 10 carbon atoms per molecule, said blocks B comprising from about 50 to about 95% by weight of the total block copolymer.

8. The coated glass container of claim 7, wherein in said thermoplastic elastomer said A blocks comprise from about 10 to about 40% by weight of the total block copolymer, and said B blocks comprise from about 60 to about 90% by weight of the total block copolymer and wherein the coated glass container has been baked at a temperature of about 150° to about 160° C. for a time of about 10 to about 30 minutes.

9. The coated glass container of claim 7, wherein in said thermoplastic elastomer:

(a) each A is a polymer end block comprising styrene and having a number average molecular weight in the range of from about 5,000 to about 75,000, said blocks A comprising from about 15 to about 35% by weight of the total block copolymer, and (b) each B is a polymer mid block having a number average molecular weight of from about 30,000 to about 300,000, and comprising a polymer formed from alpha, gamma butadiene, said blocks B comprising from about 65 to about 85% by weight of the total block copolymer.

* * * * *